Patented Oct. 28, 1941

2,260,384

UNITED STATES PATENT OFFICE 2,260,384

HYDROXY-ALKYL AMINE CONDENSATION PRODUCTS

Wolf Kritchevsky, Chicago, Ill.

No Drawing. Application September 11, 1939, Serial No. 294,301

12 Claims. (Cl. 260—469)

My invention relates to a new class of chemical compounds and to a process for preparing such compounds.

The chief object of the invention is the production of new chemical compounds or reaction mixtures comprising condensation products containing such novel chemical compounds.

I have discovered that secondary and tertiary hydroxy alkylamines or alkylolamines may be condensed with aromatic or hydroaromatic acid substances or acylating compounds such as the free acids, esters of such acids or halides of such acids, or any other derivative thereof which will condense with the secondary or tertiary hydroxy alkylamine or alkylolamine to split out water or acid so as to bring about a union of the two molecules. In the case of tertiary hydroxy alkylamines such as triethanolamine, for example, only esters are formed. In those cases where a secondary alkylolamine as, by way of illustration, a dihydroxy alkylolamine, such as diethanolamine, is condensed with an aromatic or hydroaromatic acid, as shown for instance in Examples 3 and 10, amides and ester-amides may and, it would appear, usually do form, in certain cases, in predominating amounts. In general, the esters are more satisfactory for my purposes.

Thus, for example, more specifically, I have found that when triethanolamine or any dihydroxy or tri-hydroxy alkylamine is condensed with an aromatic or hydroaromatic acid or a halide, anhydride, ester or other reactive derivatives of such acids, condensation products will form by the union of the triethanolamine or the like with the aromatic or hydroaromatic acid or derivative thereof with the splitting out of either water or an acid. The resulting condensation products are, in general, basic and form salts with any chemicals having acidic groups as, for example, hydrochloric acid, acetic acid and the like.

The condensation products of my invention are sharply distinguishable in chemical structure from and have many radically different properties than the salts or soaps resulting from the interaction of secondary or tertiary hydroxy alkylamines with aromatic or hydroaromatic acids or the like. In the case of the formation of the salts or soaps of the secondary or tertiary hydroxy alkylamines with such acids or the like, the two compounds combine, forming an addition product. On the other hand, my condensation products result from a union of the secondary or tertiary hydroxy alkylamine with the aromatic or hydroaromatic acid or the like whereby water or an acid, as stated, splits out.

It will be seen, therefore, that in the production of the condensation products of my invention a reaction temperature must be employed which is sufficiently high to split out water or an acid as a result of the union of the molecules of secondary or tertiary hydroxy alkylamine and aromatic or hydroaromatic acid or derivative thereof. Where the free acid is employed in the condensation reaction, in which case water splits out, it will be seen that a temperature of at least about 100 degrees C. should be utilized. However, for appreciable speed of reaction, it is advisable to employ more elevated temperatures and, as a general rule, a temperature range of 150 degrees C. to 175 degrees C. will serve in most cases. It will be understood, of course, that temperatures somewhat lower than the preferred range may be employed as well as higher temperatures but in no case, obviously, will the temperature be sufficiently high to cause decomposition of the reacting ingredients or the resulting product. The length of time for carrying out the reaction will likewise vary but, within the preferred temperature operating range, a few hours will usually suffice, excellent results being obtained in most cases by carrying out the reaction for from two to four hours.

For the benefit of those skilled in the art, I give hereinafter a number of representative examples which are by no means exhaustive but which I deem sufficient to teach those skilled in the art the manner in which my invention may be practiced:

1. One mol of triethanolamine is condensed with one mol of benzoic acid at 150 degrees C. to 175 degrees C. for two to four hours, while stirring.

2. One mol of triethanolamine acetate is condensed with one mol of abietic acid at about 175 degrees C. for two to four hours, while stirring.

3. One mol of diethanolamine is condensed with one mol of benzoic acid at 150 degrees C. to 175 degrees C. for two to four hours, while stirring.

4. One mol of triethanolamine acetate is condensed with one mol of naphthoic acid at about 175 degrees C. for two to four hours, while stirring.

5. One mol of benzoyl chloride is condensed with one mol of methyl diethanolamine at 150 degrees C. to 175 degrees C. for about three or four hours, while stirring.

6. One mol of abietic acid is condensed with one mol of triethanolamine at 175 degrees C. for four hours, while stirring.

7. One mol of abietic acid is condensed with one mol of butyl diethanolamine at 170 degrees C. to 175 degrees C. for three to four hours, while stirring.

8. Two mols of benzoyl chloride are condensed with one mol of triethanolamine for three to four hours, with stirring.

9. Two mols of naphthoic acid are condensed with one mol of triethanolamine at 170 degrees C. to 175 degrees C. for two to four hours, with stirring.

10. One mol of diethanolamine is condensed with one mol of p-toluene sulphonic acid at about 160 degrees C. for two to four hours, with stirring.

It is clear that the secondary or tertiary hydroxy alkylamines and the aromatic or hydroaromatic acids or the like may be condensed in varying molal proportions. Thus, for example, one mol of triethanolamine, may be condensed with one, two or three mols of aromatic or hydroaromatic acid or the like.

The secondary or tertiary hydroxy alkylamines or alkylolamines which may be employed in the condensation reaction include, among others and in addition to those mentioned in the various examples, propanolamines, butanolamines, ethanol butanolamines, diethanol butanolamines; alkyl derivatives of hydroxy alkylamines or alkylolamines, that is, hydroxy alkylamines wherein hydrogen attached to nitrogen is replaced by alkyl such as ethyl, methyl, butyl and the like; as well as mixtures of these and other hydroxy alkylamines.

The aromatic and hydroaromatic acids or derivatives thereof which are condensed with the secondary and tertiary hydroxy alkylamines may likewise be selected from a large group, those mentioned hereinabove being only illustrative. It will be understood, of course, that mixtures of said acids or their derivatives may be employed and that such may be condensed with either substantially pure secondary or tertiary hydroxy alkylamines or mixtures thereof such as may be found, for example, in commercial products.

At least most of the condensation products of my invention function, among other things, as emulsifying and dispersing agents, as precipitants, as wetting agents and the like. Thus, for example, most of them may be employed in dispersions or emulsions containing water and water-immiscible materials such as oils. Many of the condensation products have valuable properties also in the dye industry where, for example, they may be employed to disperse vat dyestuffs in aqueous media, as well as for the production of modified dye products as disclosed in patent No. 2,022,678.

Wherever the term "condensation product" is employed, it will be understood to cover a reaction product between an acid or derivative thereof and an alkylolamine wherein water or acid or the like is split out as a result of the union of the molecules of acid or derivative thereof and alkylolamine; similarly, the term "condensing" is employed to cover a process wherein water or acid or the like is split out as a result of the union of the molecules of acid or its derivative and alkylolamine.

The present application is a continuation-in-part of my application, Serial No. 271,711, filed May 4, 1939, which is, in turn, a continuation-in-part of my earlier application, Serial No. 476,235, filed August 18, 1930.

What I claim as new and desire to protect by Letters Patent of the United States is:

1. A chemical compound in the form of an ester comprising triethanolamine in which one "H" of the "OH" groups is substituted by a member selected from the group consisting of aromatic and hydroaromatic acid acyl radicals.

2. Abietic acid esters of a member of the group consisting of secondary and tertiary hydroxy alkylamines containing at least two hydroxy groups.

3. The process for the manufacture of dispersing agents which comprises condensing a member of the group consisting of secondary and tertiary hydroxy-alkyl amines containing at least two hydroxy groups with a member selected from the group consisting of aromatic and hydroaromatic acid acylating compounds.

4. The process for the manufacture of dispersing agents which comprises condensing a hydroxyl-alkyl amine, containing more than one hydroxy-alkyl group attached to a nitrogen atom, with an aromatic carboxylic acid acylating compound.

5. An ester of a secondary hydroxy-alkyl amine having at least two hydroxy groups and a member selected from the group consisting of aromatic and hydroaromatic acids.

6. An ester of a tertiary hydroxy-alkyl amine having at least two hydroxy groups and a member selected from the group consisting of aromatic and hydroaromatic acids.

7. An ester-amide of a di-hydroxy-alkyl amine and a member selected from the group consisting of aromatic and hydroaromatic acids, the ester linkage being through an hydroxy group and the amide linkage being through an amino group of said di-hydroxy-alkyl amine.

8. An ester-amide of diethanolamine and a member selected from the group consisting of aromatic and hydroaromatic acids, the ester linkage being through an hydroxy group and the amide linkage being through the amino group of the diethanolamine.

9. The process for the manufacture of dispersing agents which comprises condensing a di-hydroxy-alkyl amine with an aromatic carboxylic acid acylating compound to introduce an aromatic acyl radical into the molecule of said di-hydroxy-alkyl amine.

10. The process for the manufacture of dispersing agents which comprises condensing a tri-hydroxy-alkyl amine with an aromatic carboxylic acid acylating compound to introduce an aromatic acyl radical into the molecule of said tri-hydroxy-alkyl amine.

11. Condensation products of a member of the group consisting of aromatic and hydroaromatic carboxylic acids with a member of the group consisting of secondary and tertiary alkylolamines having at least two hydroxy groups.

12. Condensation products of aromatic carboxylic acids with a member selected from the group consisting of diethanolamine, triethanolamine and mixtures thereof.

WOLF KRITCHEVSKY.